Aug. 14, 1951 W. L. GENSEL 2,564,059
FREQUENCY CONTROL SYSTEM FOR RECEIVERS
Filed Jan. 29, 1948
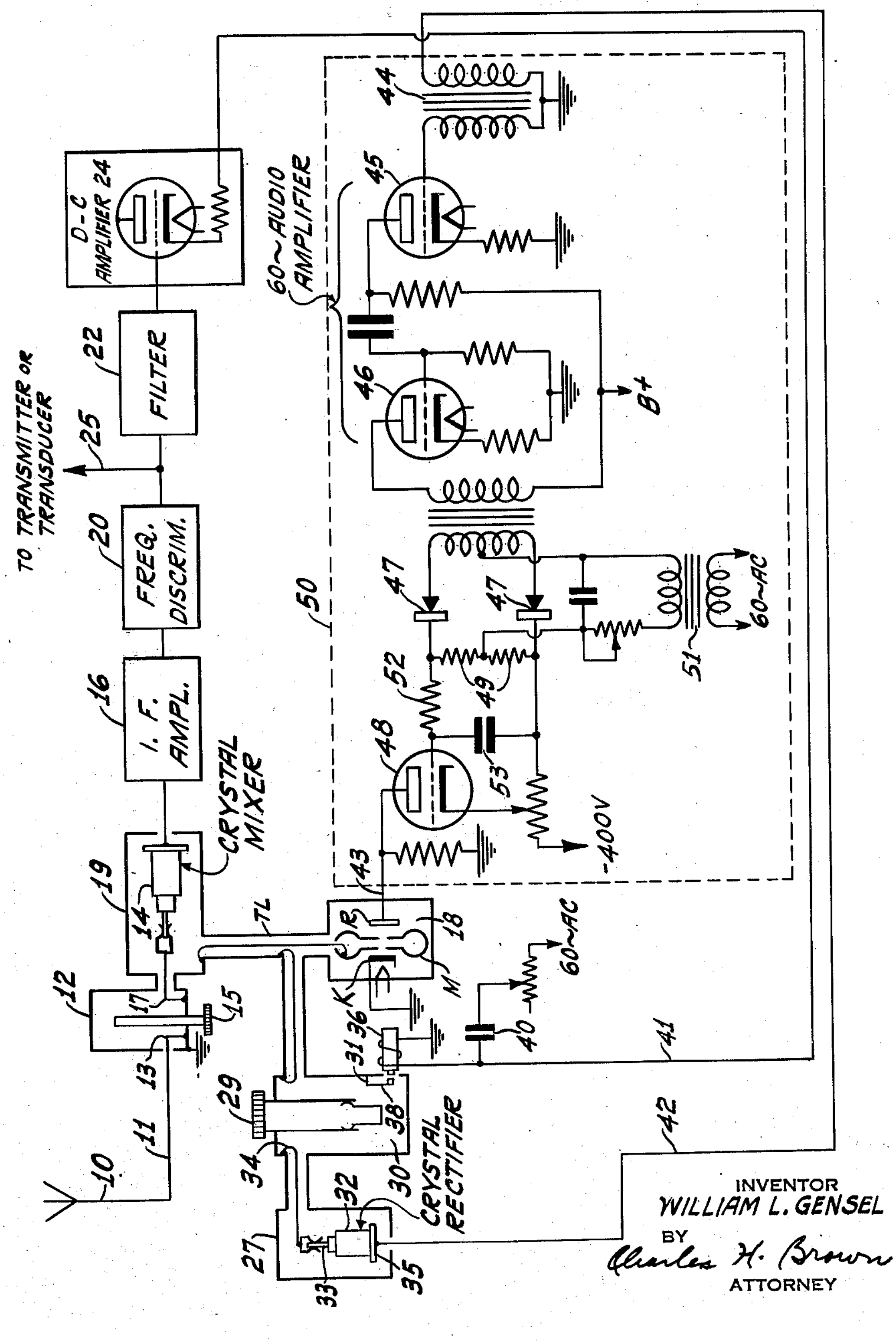
INVENTOR
WILLIAM L. GENSEL
BY
Charles H. Brown
ATTORNEY Patented Aug. 14, 1951 2,564,059

UNITED STATES PATENT OFFICE 2,564,059

FREQUENCY CONTROL SYSTEM FOR RECEIVERS

William L. Gensel, Philadelphia, Pa., assignor to Radio Corporation of America, a corporation of Delaware Application January 29, 1948, Serial No. 5,136

7 Claims. (Cl. 250—20)

This invention relates to a frequency control system for receivers, and has especial application to a microwave receiver.

One difficulty heretofore experienced in conventional broad band receivers having means for tuning or locking the receiver to an incoming signal has been caused by the automatic frequency control (AFC) system which sometimes locks the receiver on an interfering carrier adjacent the desired signal.

The automatic frequency control system of the present invention overcomes this difficulty. Among some of the objects of the present invention are (1) to maintain a receiving system constantly tuned to the frequency of a remote transmitter despite drift in frequency of the transmitter, and (2) to maintain constant the beat frequency of a heterodyne type receiver despite changes in frequency of the incoming carrier.

A more detailed description of the invention follows, in conjunction with a drawing whose single figure illustrates, partly diagrammatically and partly schematically, one embodiment of the invention.

Referring to the drawing, there is shown a microwave heterodyne receiver comprising any suitable antenna 10 (directive or non-directive), feeding into a concentric line resonator 12, the latter, in turn, coupled through a crystal mixer 14 to an intermediate frequency amplifier 16. A local heterodyning or beating oscillator 18 of the reflex Klystron type is shown coupled to the mixer 14 via a coaxial line TL. The output of the intermediate frequency amplifier 16 feeds into a conventional balanced frequency discriminator 20. The audio output of the discriminator is fed to an A. C. filter 22 which filters out the alternating current components and passes only direct current variations to a direct current amplifier 24.

If the receiver above described is to be used as a repeater station in a relay system, then the audio output from the discriminator 20 is taken off by lead 25 and used to control a transmitter (not shown) for repeating the signals on a carrier wave to the next station in the relay system. If, however, the receiver is the final receiving station in the relay system, then the lead 25 will extend to a suitable transducer circuit (not shown).

It should be noted that the antenna 10 is coupled by a line 11 into the space between the inner and outer conductors of the resonator 12, through a suitable coupling loop 13. The effective length of the inner conductor of resonator 12, and hence the resonant frequency of this resonator, is controlled by a knob 15. The crystal mixer 14 is connected at one end to a loop 17 which is located in the interior of resonator 12. A metallic shield 19 surrounds this crystal mixer. Actually, the resonator 12 is illustrative of any suitable cavity resonator which may take different forms.

The reflex Klystron 18 (a velocity modulation tube) is also illustrative of any suitable beating or heterodyning oscillator whose frequency is to be controlled. By way of example, this oscillator may generate oscillations of the order of 4000 megacycles. Oscillator 18 is shown as comprising an evacuated envelope having therein a cathode K for producing a beam of electrons, a toroidal cavity resonator M of suitable dimensions and having apertures in both sides to permit the beam of electrons from cathode K to pass therethrough, and a repeller electrode R. The voltage on the repeller electrode is of negative polarity relative to the cathode and repels the electrons passing through the toroidal resonator M. The dimensions of the cavity resonator M and the voltage on the repeller electrode R determine to a large extent the frequency of oscillations generated by the Klystron 18. Such an oscillator is well known in the art.

In order to control the frequency of the beating or heterodyning oscillator 18, there is provided a reference tuned circuit 30, here shown as a relatively low loss concentric line resonator although it will be understood that any suitable cavity resonator such as a toroid can be used instead. The length of the inner conductor of the reference resonator 30 is adjustable by the knob 29 and manually controls the frequency of this resonator.

A crystal rectifier 32 is coupled at one end 33 to the reference resonator 30 by means of the loop 34. Loop 34 enters the interior of the resonator 30 and is coupled to the electro-magnetic field within this concentric line tuned circuit. A metallic shield 27 surrounds the crystal rectifier 32.

The frequency of the low loss resonator 30 is modulated or changed up and down at an audio frequency rate by means of the vibrator coil 36 and the vibrator spring 38 controlled by coil 36. Coil 36 is part of a solenoid and is coupled through condenser 40 to a source of 60 cycles alternating current. The vibrator spring 38 is located in the interior of the concentric line resonator 30 and is fixed at one end 31 and has its other end secured to an iron button which vibrates the spring in and out of an aperture adjacent the solenoid 36. It should be noted that the coil 36 is also connected by a lead 41 to the cathode of the D. C. amplifier 24.

The end 35 of crystal rectifier 32 is connected by way of lead 42 to an automatic frequency control circuit 50 shown in a dot and dash line box. This automatic frequency control circuit 50 controls the frequency of the heterodyning oscillator 18 to whose repeller electrode it is connected by way of lead 43. More specifically, the control circuit 50 includes a transformer 44, a 60 cycle audio amplifier comprising a pair of vacuum tube triode stages 45 and 46 arranged in cascade, a balanced phase detector circuit including a pair of rectifiers 47, 47, and a D. C. amplifier 48. A pair of equal value resistors 49 are connected in series across the output of the balanced phase detector. Alternating current in the form of 60 cycle energy is supplied to the balanced phase detector through an audio transformer 51.

The automatic frequency control system 50 and the manner in which it causes the frequency of the heterodyning oscillator 18 to follow the frequency of the reference tuned circuit 30 is similar in construction and operation to that described in copending application, Serial No. 671,454, filed May 22, 1946, by L. E. Thompson, assigned to the common assignee, which has eventuated as U. S. Patent 2,462,294, granted February 22, 1949.

In the operation of this portion of the system, the coil 36 changes the resonant frequency of the reference tuned circuit 30 at a rate of 60 cycles per second. The alternating current output from the crystal rectifier 32 is either near zero or has a frequency of 120 cycles when the oscillator 18 is in tune with the center frequency of resonator 30, and a 60 cycle component appears when the oscillator becomes detuned from the cavity resonator 30. This alternating current output from the crystal rectifier 32 is amplified by the 60 cycle audio amplifier 45, 46 and operates the frequency correcting circuit. This frequency correcting circuit functions in such manner as to hold the frequency of the oscillations produced by the oscillator 18 to the frequency of the reference resonator 30. When the oscillator 18 is exactly in tune with the reference resonator 30 there will be either no alternating current voltage applied to transformer 44 or the second harmonic of the 60 cycle modulating supply. The vibrator causes the resonant frequency of the resonator 30 to change from one side to the other side of the frequency of the oscillator at a period of 60 cycles per second, and this produces an alternating current variation of the crystal current at a period of 120 cycles per second. This 120 cycle current is amplified by the audio amplifier 45, 46 and applied to the balanced phase detector but this 120 cycle current does not produce any direct current output potential from the balanced phase detector. If the frequency of the oscillator 18 drifts in a direction so as to be higher than the desired frequency of the oscillator 18, then a 60 cycle voltage component will be applied to transformer 44. This 60 cycle voltage component is developed in the crystal rectifier 32 and is amplified by a two-stage audio amplifier 45, 46 and fed to the balanced detectors 47. The potential produced by the balanced phase detector in this case will be a direct current output which may be in a negative direction. It should be noted that the detectors or copper oxide rectifiers 47 are excited in parallel by the same 60 cycle alternating current source which modulates the reference resonator 30. When no 60 cycle error voltage is present, the rectifier currents in the resistors 49 are equal and opposite in direction, so that the sum is zero. However, when 60 cycle alternating current is supplied to the detectors 47 from the audio amplifier, the currents through the resistors 49 become unbalanced during one-half cycle of the 60 cycle wave so that the sum voltage is not zero but is either a positive or negative half cycle wave depending on the phase relationship of the two exciting voltages.

The output from the balanced phase detector is fed to the direct current amplifier 48. The resistor 52 and the capacitor 53 filter out the alternating current components and apply the direct current component to the direct current amplifier 48. A change in anode voltage then occurs in the direct current amplifier 48 and this change is applied to the repeller electrode R of the oscillator 18 in order to correct the frequency of the oscillations produced by the reflex "klystron" oscillator.

In addition to the automatic frequency control circuit 50, the invention utilizes the D. C. output voltage from the receiver discriminator 20 to control the resonant frequency of the reference resonator 30 over a relatively narrow bandwidth (the receiver bandwidth or less). This is done by connecting the cathode of D. C. amplifier 24 to the winding of solenoid 36 by way of lead 41, as a result of which variations of current through tube 24 cause the resonant frequency of the reference resonator 30 to vary, in turn, affecting the frequency of the local oscillator 18. If the polarity of the discriminator output is correct, this variation will tend to change the frequency of the local oscillator 18 so that the D. C. output of the balanced discriminator 20 is zero, the correct condition for tuning.

The system of the invention serves to maintain the beat frequency in the receiver always constant despite changes in frequency of the incoming carrier. The frequency of the incoming carrier may vary due to undesired drifting in frequency of the transmitter (on account of voltage changes or temperature variations). To achieve this result of constant beat frequency, a D. C. voltage is obtained from the frequency discriminator whose magnitude and sense depends upon the extent of frequency drift of the incoming signal and the duration of such drift. This D. C. voltage is applied via lead 41 to the solenoid 36 to change the frequency of the reference resonator 30 in such sense as to cause the heterodyning oscillator 18 to change its frequency so as to maintain a constant beat frequency in the output of the mixer crystal 14. The D. C. voltage on lead 41 is, in effect, a bias which varies the range of positions and the position of rest of the vibrating spring 38, thus varying the frequency of the reference resonator 30. The heterodyning oscillator 18 is controlled or entrained by the reference resonator 30 through the intermediary of the automatic frequency control circuit 50. Thus a change in the beat frequency in the receiver will cause a change in the frequency of the reference resonator 30, in turn, causing a change in the frequency of the local or heterodyning oscillator. The extent of the bandwidth control depends upon the Q of the stable reference resonator 30. Although resonator 30 is essentially low loss compared to conventional types of tuned circuits, the Q of this resonator must be relatively low (viz: a high loss resonator)

if the bandwidth of the frequency control system is to be broad.

The following additional explanation of the operation of the system may be helpful in understanding the possibilities of the invention. Let it be assumed that the reference resonator 30 and the local oscillator 18 have been tuned to receive the desired signal, and that for some reason the power has been turned off allowing the oscillator 18 to cool. When the power is turned on, the oscillator 18 will start up at some frequency outside the control range of the AFC circuit 30, 50, and 18. Let it also be assumed that at this frequency an undesired signal is received. This signal will cause a change in the frequency of the reference resonator. However, the AFC circuit 50 will not affect the local oscillator 18 and there will be no tendency on the part of the receiver to lock into this undesired signal. This is because the frequency of oscillator 18 is now outside the control frequency range of the reference resonator, and will not be entrained by the reference resonator under such conditions.

Assuming, however, that the frequency of the oscillator 18 drifts into the range of control of the AFC system, and further that at this time an interfering signal is present, the signal will then operate the AFC system and cause the tuning of the reference resonator to change. The system will not tend to lock into this signal, however, unless the frequency of this signal is close enough to the initial frequency of the reference resonator to pull the tuning of the reference resonator to within half the I. F. discriminator bandwidth of the undesired signal. If the undesired signal is not this close to the desired signal, the oscillator will be pulled back toward the original reference point, the receiver will be tuned away from the interfering signal, and the tuning of the reference resonator will return to its original state. To prevent the system from locking on an undesired signal, the sensitivity of the improved circuit of the invention is so chosen that the nearest interfering signal will not affect the reference resonator to such an extent as to bring its tuning to within half the bandwidth of the I. F. discriminator when this discriminator is receiving the interfering signal.

Let it now be assumed that the AFC system has pulled in the oscillator to the correct frequency but that in the meantime the transmitter frequency has shifted slightly. The D. C. voltage across the discriminator will act on the AFC reference resonator and tune it to a higher or lower frequency depending on the direction of drift of the transmitter. The change in tuning of the reference resonator will pull the oscillator in the same direction, causing the system to tend to stabilize at the zero voltage point on the discriminator. The receiver is now correctly tuned to the transmitter.

It should be understood that the invention is not limited to the use of a concentric line resonator employing a vibrator, since if desired the vibrator can be replaced by a small reversible electric motor driving a suitable tuning plunger within the reference resonator. In such a case, the electric motor would be controlled by the D. C. output voltage derived from the discriminator. Another alternative would be to replace the reference resonator, as shown, by a cavity resonator having a thin flexible magnetic wall acting as a diaphragm and to vary the position of the diaphragm through a solenoid provided with a magnetic core, the solenoid, in turn, being controlled by the D. C. output current derived from the discriminator output. This last method is especially applicable to re-entrant cavities in which the spacing is small and the dimensions are critical. Still another method of controlling the frequency of the reference resonator involves thermal tuning. A heater element controlled by the receiver output could be used to cause expansion or contraction of a section of a reference cavity resonator.

What is claimed is:

1. A radio receiver system including a mixer stage, a heterodyning oscillator coupled to said mixer stage to produce an intermediate frequency signal, said oscillator having a frequency controlling element, a frequency discriminator coupled to the output of said mixer stage, a reference resonator coupled to the output of said heterodyning oscillator, an automatic frequency control circuit coupled between said reference resonator and said frequency controlling element for controlling the frequency of said oscillator from said reference resonator, and means coupled between the output of said frequency discriminator and said reference resonator for controlling the frequency of said reference resonator.

2. A radio receiver system including a mixer stage, a heterodyning oscillator coupled to said mixer stage to produce an intermediate frequency signal, said oscillator having a frequency controlling element, a frequency discriminator coupled to the output of said mixer stage, a reference resonator coupled to the output of said heterodyning oscillator, an automatic frequency control circuit coupled between said reference resonator and said frequency controlling element for controlling the frequency of said oscillator from said reference resonator, a filter coupled to the output of said frequency discriminator, a direct current amplifier coupled to said filter, and means responsive to the direct current passed by said amplifier for varying the frequency of said reference resonator.

3. A radio receiver system in accordance with claim 2, characterized in this, that the cathode of said direct current amplifier is coupled to said reference resonator through an element which cyclically tunes said resonator.

4. The combination with a receiver having a heterodyning oscillator producing high frequency oscillations, of a low loss resonant element, means for exciting said element with oscillations derived from said oscillator, a source of constant relatively low frequency waves, means for cyclically changing the tuning of said element under control of the waves from said source, means for rectifying oscillations derived from said cyclically tuned element, means for rectifying waves from said low frequency source, means for combining the rectified oscillations and waves, means responsive to the combined waves for varying the frequency of said oscillator, and means coupled to said receiver for deriving a direct current output from said receiver and for applying such output as a bias to said means which cyclically changes the tuning of said low loss resonant element.

5. In a radio receiver, a mixer, a heterodyning oscillator coupled to said mixer, an intermediate frequency amplifier coupled to the output of said mixer, a frequency discriminator coupled to the output of said intermediate frequency amplifier, a circuit for deriving direct current from said discriminator whenever the frequency of the incoming signal or the frequency of said oscillator drifts, a reference resonator coupled to and excited from said oscillator, a source of constant low frequency oscillations, means for cyclically changing the tuning of said reference resonator from said source, means for rectifying oscillations derived from said reference resonator, means for rectifying waves from said low frequency source, means for combining the rectified oscillations and waves, means responsive to the combined waves for changing the tuning of said oscillator, and means coupled between said first circuit and said reference resonator for changing the tuning of said reference resonator in response to the characteristics of said derived direct current.

6. In combination, a circuit carrying high frequency oscillations, a low loss resonant element, means for exciting said element with oscillations derived from said circuit, a source of relatively low frequency waves, means for cyclically changing the tuning of said element under control of waves from said source, means for rectifying oscillations derived from said cyclically tuned element, means for combining waves derived from the rectified oscillations and waves derived from said low frequency source, means responsive to the combined waves for changing the effective frequency of operation of said circuit, a mixer coupled to said circuit, and means coupled to the output of said mixer and responsive to variations in frequency from a norm for producing a direct current voltage, and a coupling between said last means and said means for cyclically changing the tuning of said resonant element, whereby the tuning of said element is varied as a function of said direct current voltage.

7. A radio receiver system including a mixer stage, a heterodyning oscillator coupled to said mixer stage for producing a beat signal, said oscillator being a velocity modulation tube having a repeller electrode, means responsive to variations in frequency of said beat signal from a norm for controlling said oscillator in such sense as to restore said norm, said means including a reference resonator coupled to and stabilizing the frequency of said oscillator over a certain range of frequencies and through a path which includes an electron discharge device arrangement, said arrangement functioning to vary the voltage on said repeller electrode; and circuits coupled between the output of said mixer and said reference resonator and responsive to a variation from said norm for producing a direct current output voltage for tuning said reference resonator over a relatively narrow bandwidth.

WILLIAM L. GENSEL.

REFERENCES CITED

The following references are of record in the file of this patent:

UNITED STATES PATENTS

| Number | Name | Date |
| --- | --- | --- |
| 2,404,568 | Dow | July 23, 1946 |
| 2,425,013 | Stotz | Aug. 5, 1947 |
| 2,462,294 | Thompson | Feb. 22, 1949 |